US008886127B2

(12) United States Patent
Kozlowski et al.

(10) Patent No.: US 8,886,127 B2
(45) Date of Patent: Nov. 11, 2014

(54) SYSTEMS, METHODS AND DEVICES FOR PROVIDING FEEDBACK ABOUT A QUALITY OF COMMUNICATION BETWEEN A DEVICE AND A REMOTE CONTROL

(75) Inventors: Anthony Kozlowski, Moonument, CO (US); Henry Gregg Martch, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 548 days.

(21) Appl. No.: 12/905,899

(22) Filed: Oct. 15, 2010

(65) Prior Publication Data

US 2011/0244802 A1 Oct. 6, 2011

Related U.S. Application Data

(60) Provisional application No. 61/320,637, filed on Apr. 2, 2010.

(51) Int. Cl.
*H04B 17/00* (2006.01)
*G08C 17/02* (2006.01)

(52) U.S. Cl.
CPC ............ *G08C 17/02* (2013.01); *G08C 2201/50* (2013.01); *G08C 2201/91* (2013.01)
USPC .................. 455/67.11; 455/456.1; 455/426.1; 455/435.1; 455/556.1; 455/563; 455/557; 455/552.1; 455/558; 455/568.1; 455/41.2; 340/539.32; 340/568.1; 340/539.1; 340/539.16; 340/39.11

(58) Field of Classification Search
USPC .......... 455/67.11, 456.1, 426.1, 435.1, 556.1, 455/563, 557, 552.1, 558, 568.1, 41.2; 340/539.32, 568.1, 539.1, 539.13, 340/539.16, 39.11, 8.1, 573.3, 572.1, 568.7
See application file for complete search history.

(56) References Cited

U.S. PATENT DOCUMENTS

| | | | | |
|---|---|---|---|---|
| 7,034,684 | B2 * | 4/2006 | Boman et al. | 340/568.1 |
| 7,813,822 | B1 * | 10/2010 | Hoffberg | 700/94 |
| 8,253,559 | B2 * | 8/2012 | Howard et al. | 340/539.32 |

(Continued)

OTHER PUBLICATIONS

Eber, Samuel "Apparatus, Systems and Methods for Compensating Infrared Noise in an Electronic System," U.S. Appl. No. 12/643,602, filed Dec. 21, 2009.

(Continued)

*Primary Examiner* — Ganiyu A Hanidu
(74) *Attorney, Agent, or Firm* — Ingrassia Fisher & Lorenz, P.C.

(57) ABSTRACT

Systems, devices and methods provide feedback about the quality of communication between a device and a remote control. A wireless signal is sent between a controlled device and the remote control. The quality of the signal can be measured and reported to a user, installer, troubleshooter, customer service agent or other person in any manner. Quality may be determined based upon the strength of the received signal as well as the amount of noise that is present. The quality measurements provide feedback that allows a user, installer, customer service representative or other person to change the positions of the device or the remote control, or to take other actions based upon the quality of the wireless signal that is received.

18 Claims, 2 Drawing Sheets

(56) References Cited

U.S. PATENT DOCUMENTS

Figure 1:
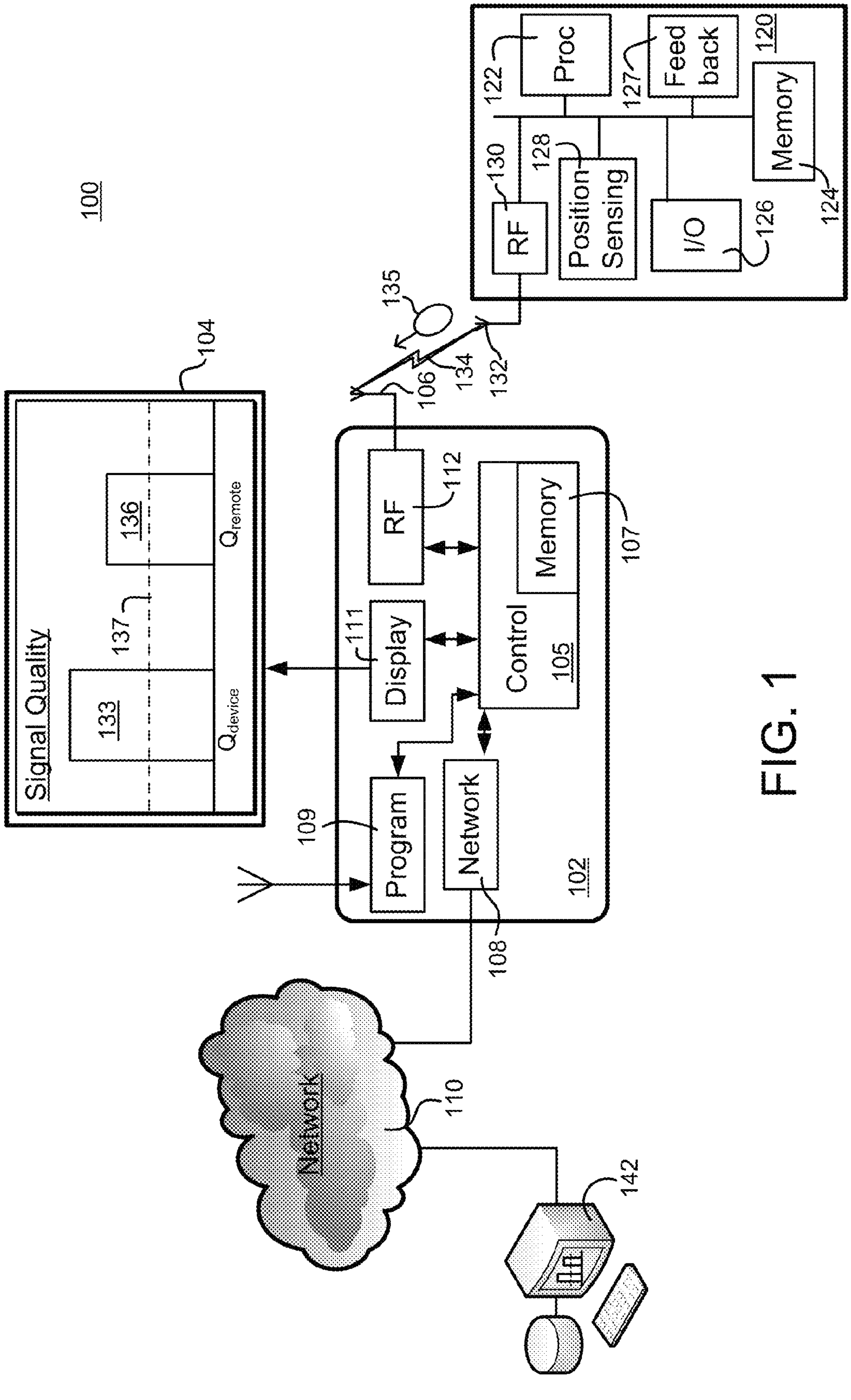

| | | | | |
|---|---|---|---|---|
| 2002/0174025 | A1* | 11/2002 | Hind et al. | 705/26 |
| 2003/0120745 | A1* | 6/2003 | Katagishi et al. | 709/217 |
| 2005/0186968 | A1* | 8/2005 | Durst et al. | 455/456.1 |
| 2007/0283400 | A1* | 12/2007 | Lee et al. | 725/107 |
| 2008/0032713 | A1* | 2/2008 | Yang | 455/458 |
| 2008/0079547 | A1* | 4/2008 | Alicot et al. | 340/10.3 |
| 2008/0092200 | A1* | 4/2008 | Grady et al. | 725/133 |
| 2008/0266085 | A1 | 10/2008 | Kagermeier et al. | |
| 2009/0153390 | A1* | 6/2009 | Zackschewski et al. | 341/176 |
| 2009/0224935 | A1 | 9/2009 | Kagermeier et al. | |

OTHER PUBLICATIONS

Kozlowski, Anthony "Signal Strength Detection," U.S. Appl. No. 12/511,755, filed Jul. 29, 2009.

Eber, Samuel et al. "Systems, Methods and Devices for Detecting Infrared Noise at a Remote Control," U.S. Appl. No. 12/900,830, filed Oct. 8, 2010.

European Patent Office, International Searching Authority, "International Search Report" mailed Jun. 22, 2011; International Patent Appln. No. PCT/US2011/030571, filed Mar. 30, 2011.

* cited by examiner

SYSTEMS, METHODS AND DEVICES FOR PROVIDING FEEDBACK ABOUT A QUALITY OF COMMUNICATION BETWEEN A DEVICE AND A REMOTE CONTROL

PRIORITY CLAIM

This application claims priority to U.S. Provisional Application Ser. No. 61/320,637 entitled SYSTEMS, METHODS AND DEVICES FOR PROVIDING FEEDBACK ABOUT A QUALITY OF COMMUNICATION BETWEEN A DEVICE AND A REMOTE CONTROL and filed on Apr. 2, 2010, which is incorporated herein by reference in its entirety.

TECHNICAL FIELD

The following discussion generally relates to communications between a wireless remote control and a remotely-controlled device, and more particularly relates to systems, methods and devices.

BACKGROUND

Wireless remote controls are widely used in consumer electronics and other settings to control many different types of devices. Televisions, media players, set-top boxes (including satellite and/or cable television receivers), audio/video components, climate controls and many other devices and systems are designed to respond to user commands that are issued using a remote control device. Television viewers, for example, commonly use remote controls to adjust the volume, to select programming, and/or to take any number of other actions relating to their televisions or television receivers.

Historically, remote controls primarily used infrared signaling that typically required a one-way line-of-sight between the remote and the controlled device. More recently, however, remote controls have been designed to communicate with using radio frequency (RF) technologies. Conventional RF implementations are no longer restricted to line-of-sight signaling paths, thereby allowing significantly improved mobility and freedom to place the controlled device in places that may not be visible to the viewer (e.g., in another room, in an attic or basement, in a cabinet or other storage space, and/or the like). This increased freedom, however, can create complications in determining a proper location for the controlled device during installation. Moreover, if quality of communications between the remote and the controlled device happen to change for any reason during operation, diagnosing the reasons for the change in quality can be challenging for many users.

Moreover, present diagnostic tools available to installers and troubleshooters can be severely limited. Often, maintenance decisions are based upon simple "go/no-go" decisions wherein the product is simply identified as non-operational, without regard to the cause of the issue. If a remote control and a controlled device do not operate properly in a particular installation, many troubleshooters will rapidly conclude that either or both components are faulty, thereby leading to expensive equipment replacements that may not be needed. Communications issues can generate a substantial number of customer service calls, service calls and unneeded equipment replacements, resulting in significant expense for the equipment operator.

It is therefore desirable to create systems and methods that are able to conveniently measure the quality of the communications between a remote control and a controlled device, and to provide feedback about the signal quality to an installer, user and/or other person. These and other desirable features and characteristics will become apparent from the subsequent detailed description and the appended claims, taken in conjunction with the accompanying drawings and this background section.

BRIEF SUMMARY

According to various exemplary embodiments, systems and methods are described for providing feedback about the quality of communications between a remote control and a controlled device such as a set-top box, television or other audio/video component. By measuring the quality of communications between the remote and the controlled device, noise sources can be identified and/or the relative positions of the device and its remote may be adjusted as needed to improve communications. By providing a convenient signal quality metric to the user, installer, troubleshooter and/or customer service agent, the customer's experience can be greatly improved.

Various embodiments provide systems, devices and methods that provide feedback about the quality of communication between a device and a remote control. A wireless signal transmitted by the device is received by the remote control. The quality of the signal is measured at the remote control, and a wireless message that includes an indication of the quality of the received wireless signal is sent from the remote control back to the device. Quality may be determined in various embodiments based upon the strength of the received signal as well as the amount of interfering noise that is present. Feedback about the quality from the device and/or the remote control allows a user, installer, customer service representative or other person to change the positions of the device or the remote control, or to take other actions based upon the quality of the wireless signal.

In various embodiments, a method is executable by a set-top box, audio/visual component or other device to provide feedback about a quality of communication between the device and a remote control. The method suitably comprises transmitting a wireless signal from the device to the remote control, receiving, at the device, a wireless message from the remote control, wherein the wireless message comprises a measurement of a quality of the wireless signal as measured by the remote control, and providing feedback from the device based upon the quality of the wireless signal that is received at the remote control.

In other embodiments, a device is configured to communicate with a remote control. The device suitably comprises a radio frequency transceiver configured to wirelessly communicate with the remote control and a controller. The controller is configured to direct the radio frequency transmitter to transmit a wireless signal to the remote control, to receive a wireless message from the remote control via the radio frequency transmitter that comprises a measurement of a quality of the wireless signal as measured by the remote control, and to provide feedback from the device based upon the quality of the wireless signal.

Still other embodiments provide a remote control configured to provide wireless commands to a controlled device. The remote control suitably comprises a radio frequency transceiver configured to receive a wireless signal from the controlled device, and a processor. The processor is coupled to the radio frequency transceiver and is configured to direct the measurement of a quality metric of the wireless signal, and to provide the quality metric of the wireless signal to the controlled device via the radio frequency transceiver.

These and other embodiments, aspects and other features are described in more detail below.

BRIEF DESCRIPTION OF THE DRAWING FIGURES

Figure 2:
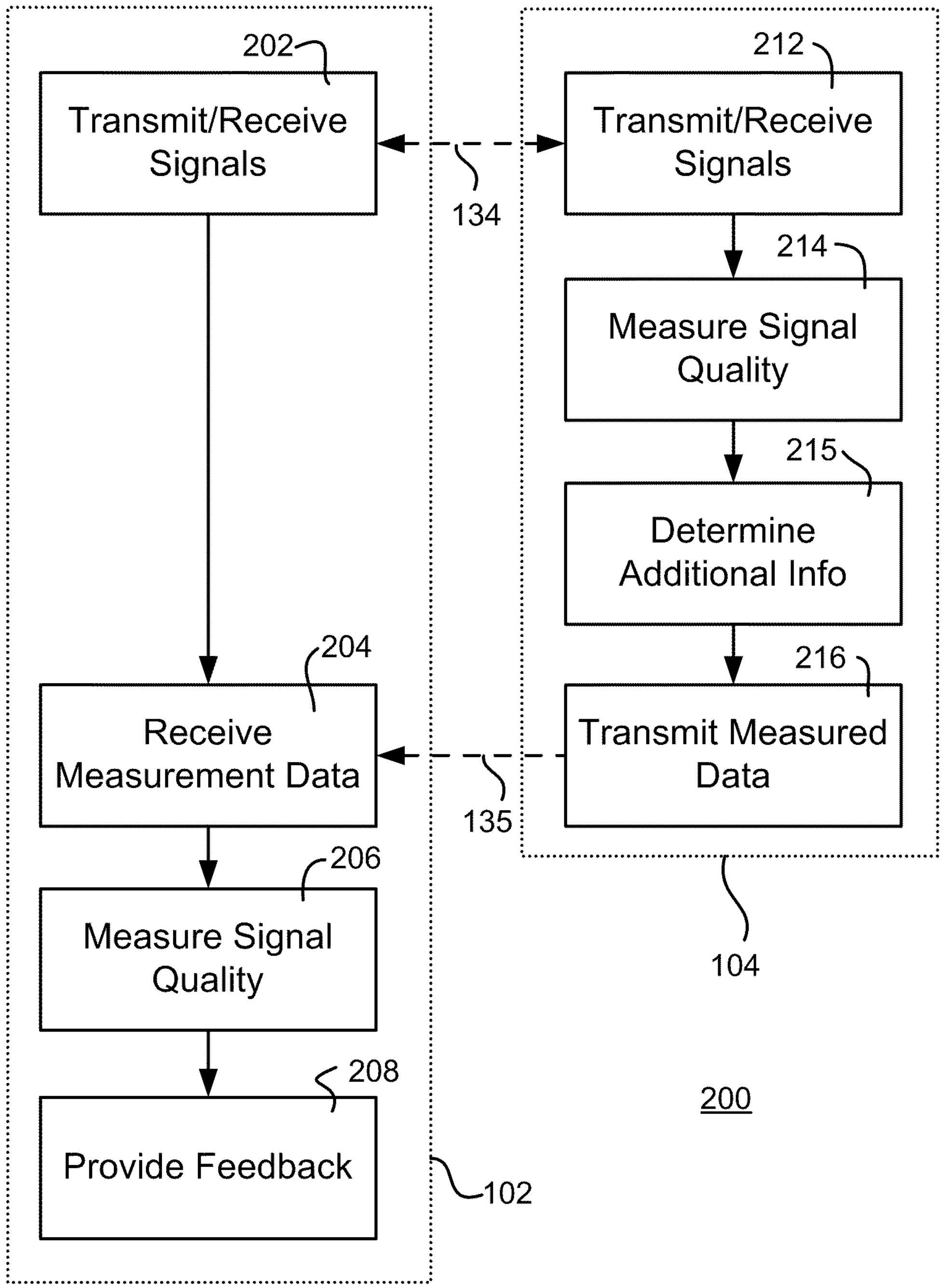

Exemplary embodiments will hereinafter be described in conjunction with the following drawing figures, wherein like numerals denote like elements, and FIG. 1 is a block diagram of an exemplary system that supports improved communications between a remote control and a controlled device; and FIG. 2 is a flowchart of an exemplary method monitoring the quality of communications between a remote and a controlled device.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, an operator of a set-top box, television, audio/video component or other device receives feedback about the quality of communications signals exchanged between the device and a wireless remote control. This feedback may be used to assist an installer, user, customer service agent and/or other person in improving the communication between the remote and the controlled device by allowing the person to move the device or the remote relative to one another. Various embodiments may also allow a person to view, in real time, the positive or negative effects of such movement.

Signal quality measurements based upon the signal strength and/or noise based diagnostics can be used for troubleshooting faulty or badly installed equipment, or to verify that good equipment is indeed good. Signal quality measurements can also be used to identify the arrival and location of new noise sources, the presence of new obstructions to signal, the unacceptability of operating at the edges of reception range, and/or any number of other factors that may affect the quality of communications. This diagnostic therefore has significant value to an operator in reducing customer calls, reducing call handling times, quicker problem resolution, more accurate and effective troubleshooting, fewer improper equipment exchanges, and/or the like. Other uses and benefits may be realized as well, as described more fully below.

In various embodiments, the remote control is able to measure the quality of wireless signals received from the controlled device based upon the measured strength of the received signal and the measured amount of noise. The signal strength, noise intensity and/or any other metric (e.g., a signal-to-noise ratio (SNR)) is then provided to the controlled device. The controlled device may alternately or additionally measure the quality of wireless signals received from the remote control in terms of signal strength, noise and/or the like to thereby allow bi-direction monitoring of signal quality. The signal quality as measured by the remote and/or the controlled device can be provided as feedback to a user, installer, customer service representative (CSR) by presenting imagery on a television or other display, by transmitting a message to a remote computer system (e.g., a computer associated with a CSR or customer service database), by providing feedback using the remote control, and/or in any other manner.

Turning now to the drawing figures and with initial reference to FIG. 1, an exemplary system 100 suitably includes a remote control 120 and a controlled device 102 that communicate via wireless signals 134. In various embodiments, remote control 120 and/or controlled device 102 are able to measure the quality of received signals 134 and to provide an indication of the received signal quality as feedback to a user, installer, CSR or other person. Feedback about the signal quality may be presented on a television or other display 104 associated with controlled device 102 in some embodiments. In other embodiments, such feedback is provided via a network 110 or other connection to a remote computing system 142, database or the like.

Device 102 is any controlled component, system or other device capable of receiving and processing wireless signals 134 received from remote control 120. FIG. 1 shows an exemplary embodiment in which controlled device 102 is a set-top box (STB) or other receiver capable of receiving television programming from a satellite, cable, terrestrial broadcast and/or other source. In this example, device 102 includes a controller 105 that interacts with a programming interface 109, a network interface 108, a display interface 111 and/or a wireless interface 112 to present received television imagery to the viewer on display 104. Other embodiments are not limited to STBs or other television receivers, however. Various equivalent embodiments of device 102 may be implemented with any other components or products, including any sort of television or other display, computer system, media player, audio/video component, control system device, garage door opener, home control system, remote detonator and/or any other device capable of responding to a wireless signals 134 received from remote control 120. Other embodiments may therefore have different components that may differ from those shown in FIG. 1. A media player or other audio/video component, for example, may not include a programming interface 109, a display interface 111 and/or network interface 108, to provide just one example.

Many different types of controlled devices 102 may perform operations under the control of any sort of controller 105. In the example shown in FIG. 1, controller 105 is any sort of microprocessor, microcontroller, digital signal processor or other programmable hardware capable of directing the actions and processes of device 102. In various embodiments, device 102 is based upon a "system on chip" (SoC) implementation that incorporates a microcontroller with memory 107, input/output and other features to perform the various signal processing and other actions of device 102. Various SoC and other integrated hardware implementations are available from Texas Instruments, Conexant Systems, Broadcom Inc., and many other suppliers as appropriate. Other embodiments may implement controller 105 and/or the other features of device 102 with any number of discrete and/or integrated processing components (e.g., any sort of microprocessor or microcontroller), memories 107, input/output features and/or other features as desired.

In the STB implementation of FIG. 1, programming interface 109 is any receiver, demodulator or other interface capable of receiving television or other media programming as desired. In various embodiments, programming interface 109 is a satellite, cable or broadcast television receiver, although other embodiments may alternately or additionally provide interfaces to a digital video recorder (DVR), digital versatile disk (DVD) and/or any other media source. Programming interface 109 may be logically and/or physically combined with controller 105 in various embodiments, and still other embodiments may not include a separately-identifiable programming interface 109, as appropriate. As noted above, many types of controlled devices 102 may not provide receiver functionality at all, so programming interface 109 may be omitted in such embodiments.

In embodiments that support network connectivity, device 102 suitably includes an appropriate network interface 108. Network interface 108 may be implemented with any sort of physical, logical and/or other interface to network 110. In various embodiments, network interface 108 includes a conventional wired and/or wireless telephone or network adapter (e.g., a conventional network interface card (NIC) or the like). Interface 108 allows device 102 to communicate via any sort of "back channel" with a server, database or other system 142 that is remotely located across network 110. In various embodiments, the network interface 108 may be combined with the programming interface 109 in the sense that media programming may be received over network 110, as desired. Some embodiments may not include a back channel and may only provide local data processing, in which case network interface 108 may not be needed or present.

Network 110 is any digital or other communications network capable of transmitting messages between senders (e.g., device 102) and receivers (e.g., computing system 142). In various embodiments, network 110 includes any number of public or private data connections, links or networks supporting any number of communications protocols. Network 110 may include the Internet, for example, or any other network based upon TCP/IP or other conventional protocols. In various embodiments, network 110 could alternately or additionally incorporate a wireless and/or wired telephone network, such as a cellular communications network for communicating with mobile phones, personal digital assistants, and/or the like. Network 110 may also incorporate any sort of wireless or wired local area networks, such as one or more IEEE 802.3 and/or IEEE 802.11 networks. Various embodiments may provide different features that make use of different types of networks 110, as appropriate.

Display interface 111 is any physical and/or logical interface to a television or other display 104. Some types of controlled devices 102 may incorporate a built-in display 104, such as the display in a laptop or other portable computer, a media player, a personal digital assistant and/or the like. In other embodiments wherein device 102 provides video output signals to an external display 104, such signals may be provided in any compatible format. In embodiments wherein display 104 is a conventional television, for example, display interface 111 may provide video and audio output signals in any conventional format, such as component video, S-video, High-Definition Multimedia Interface (HDMI), Digital Visual Interface (DVI), IEEE 1394, and/or any other formats as desired. Programming content, feedback information about the quality of communication, and/or any other information may be equivalently presented on any sort of presentation device other than a conventional display, including any sort of audible, visual, data, kinetic/tactile, and/or other feedback device, as desired. In some embodiments, feedback about the quality of communication may be provided via the remote control, as described more fully below.

Controlled device 102 and remote control 120 communicate using wireless signals 134 in any convenient manner. In various embodiments, device 102 includes a wireless interface 112 that is any sort of wireless receiver, transceiver or other module capable of wirelessly receiving commands from a remote control 120 via antenna 106. In various embodiments, wireless interface 112 implements a conventional IEEE 802.15.4 ("ZIGBEE") transceiver that is able to transmit and receive messages with other compatible transmitters and/or receivers, such as a transceiver in remote control 120. Other embodiments may not be confined to IEEE 802.15.4 implementations, but may instead make use of any other wireless local area network (WLAN) or other short-range wireless signaling techniques such as IEEE 802.15.1 ("BLUETOOTH"), IEEE 802.11 ("WI-FI") and/or any other wireless communications techniques as desired. The ability to communicate in an bi-directional manner between the remote control 120 and the controlled device 102 allows the devices to share information regarding signal quality of communications or the like. In contrast to conventional remote control systems that only processed one-way communications from the remote to the controlled device, two-way communications provides much greater opportunity for information sharing and improved diagnostics.

In some implementations, wireless interface 112 includes an appropriate received signal strength indication (RSSI) feature that is able to measure the intensity of received RF signals in any manner. This feature may be used to gather any amount of useful information, including information about the quality of communications between controlled device 102 and remote control 102. For example, various embodiments could measure signal strength (e.g., the intensity of signals 134 that are transmitted by remote control 120), background noise (e.g., the intensity of signals generated by sources other than remote control 120), and/or the like. Other embodiments may provide signal measurement or computation using logic associated with controller 105 and/or other components of device 102, as appropriate. Signal intensity may be measured from the magnitude of the baseband signal received from antenna 106, for example, although other embodiments may measure signal intensity using digital processing or other techniques as desired. In various embodiments, a value for the received signal strength that is used to select or change a communications channel (e.g., an IEEE 802.155.4 channel) can be provided for further processing and feedback to the user, as described more fully herein. Note that signal quality information may be obtained from either or both of the remote control 120 and/or the controlled device 102. Some embodiments may therefore rely upon data collected from the remote control 120 in addition to or in place of any signal quality information gathered from wireless interface 112.

Device 102 is able to receive and process commands provided by a viewer or other user using remote control 120. Generally speaking, remote control 120 may be implemented using any sort of conventional interface that accepts user inputs provided through buttons or other features, and that generates wireless signals 134 that relay the user's commands to the controlled device 102 as desired. To that end, remote control 120 typically includes any sort of conventional processor 122, memory 124 and input/output features 126 that are commonly associated with conventional remote controls.

Remote control 120 also includes an appropriate RF interface 130 that supports wireless communications with device 102 via antenna 132 or the like. In general, RF interface 130 will provide any appropriate hardware, software, firmware and/or other logic to support communications that are compatible with RF interface 112 of device 102. Various embodiments may support IEEE 802.15.4, IEEE 802.15.1, IEEE 802.11 and/or any other wireless local area network (WLAN) or other wireless signaling techniques as desired for compatibility with controlled device 120.

Remote control 120 may also be able to measure the intensity of received RF signals, and/or to obtain other useful information as appropriate. As noted above, signal quality measurements may be obtained from the remote control 120 and/or from the controlled device 102. In embodiments wherein the remote control is able to gather signal quality information, the strength of signals 134 received from device 102 may be determined, as well as the magnitude of noise produced by sources other than device 102. Signal intensity measurements may be performed using RSSI circuitry associated with RF interface 130, for example, or by any other circuitry or logic within remote control 120. Remote control 120 appropriately measures the strength of signals 134 that are received from controlled device 102 as well as the amount of any noise that may be present. Some exemplary techniques for measuring noise levels with a remote control are described in U.S. patent application Ser. No. 12/511,755, which is entitled SIGNAL STRENGTH DETECTION and was filed Jul. 29, 2009. Any number of additional or alternate signal quality metrics may be collected and provided to device 102 via RF transceiver 130, as described more fully below.

In various embodiments, remote control 120 is also able to determine its position in absolute or relative terms, and to provide an indication of the position to the controlled device 102. Such embodiments may incorporate any sort of position sensor 128, such as any sort of global positioning system (GPS) receiver, interferometric or similar sensor that would allow the use of dead reckoning techniques, and/or the like. Other embodiments may support triangulation of the position by processing signals 134 received from multiple transmitters, or using any other techniques. In embodiments that support position sensing, position information may be correlated to the signal strengths measured at various positions to thereby improve identification of locations where the signal quality is best. Position sensing is an enhancement feature that may be present in some embodiments, while other embodiments may omit such functionality entirely.

In operation, then, either or both of remote control 120 and/or controlled device 102 is able to receive wireless signals 134 from the other device and to measure the quality of the received signals 134. Such information may be provided via a message 135 back to transmitting device, as desired, to indicates the quality of the received signals. Signal quality information may also be provided as feedback to a user, installer, administrator, CSR, database, computer system and/or other recipient as desired.

Signal quality may be monitored on a continuous, periodic or other temporal basis so that the feedback information can be updated as desired. In various embodiments, signal quality measurements may be active in a diagnostic mode in which an installer or other person uses the quality metrics to adjust the positions of device 102 and/or remote control 120. Various embodiments are able to update the information presented on display 104 in real time (or near real time) as new signal quality measurements are received, thereby allowing the user or installer to readily observe changes in signal quality as device 102 and/or remote control 120 are moved with respect to each other. This feedback may be used, for example, to determine a more desirable location for the device 102 and/or the remote 120 during installation or maintenance of device 102. Such information may have other uses in troubleshooting and/or operation of device 102 as well. Other embodiments may gather quality metrics during regular operation of device 102. Such embodiments may store quality metrics in a log or database to support later review and troubleshooting. In some embodiments, a pop up window or other message can be provided to a viewer when signal quality drops below an acceptable level, thereby prompting the viewer to change positions, to turn off a source of noise, or to take another appropriate action.

In the exemplary embodiment illustrated in FIG. 1, the signal qualities as measured from device 102 and remote control 120 are presented graphically on display 104 as bars 133 and 136, respectively. Other embodiments may display the signal quality data in other graphical formats or in alphanumeric terms, as appropriate. Still other embodiments may provide separate values for signal strength and measured noise rather that the signal-to-noise ratio or other combined metric that is shown in FIG. 1. FIG. 1 also shows a graphical display of a threshold line 137 that indicates an acceptable signal quality to provide a reference for the viewer.

In various embodiments, the measured signal quality from device 102 and/or remote control 120 is additionally or alternately provided over network 110 to a remote computing system 142 for display, archival and/or other purposes. In various embodiments, a CSR or administrator may use the signal quality information to assist in determining a suitable position for device 102 and/or remote control 120, or for any other purpose. Feedback information may also be stored in a log, database or other repository that is associated with computer system 142, with device 102, or any other server as desired.

In still other embodiments, signal quality information may be provided from any sort of visual, audible, tactile or other feedback device 127 the remote control 120. Such information may be provided on any sort of display associated with remote control 120, for example. Other embodiments may provide feedback using LEDs or similar lights (which may flash, progressively illuminate, or otherwise indicate signal quality in any manner), audible tones of varying intensity or pitch, tactile signals (e.g., vibrations of varying intensity or frequency), or the like. Signal quality information may be measured directly at the remote in some implementations. In other embodiments, some or all of the signal quality data may be obtained from the controlled device 102 or another source via signals 134, as desired. Providing feedback from the remote control 120 may allow the device to serve as a "Geiger counter" type meter wherein different signal quality may be monitored as the remote is moved with respect to the controlled device 102. That is, the user (or other person holding the remote) may be able, in some embodiments, to receive instant feedback as to the quality of signal communications between the remote control 120 and the controlled device 102 as the remote 120 is moved around the room or other space. This diagnostic may be very convenient in installing or troubleshooting equipment.

Turning now to FIG. 2, an exemplary method 200 for providing feedback about the quality of communications between a device 102 and a remote control 120 suitably includes the broad steps of transmitting and receiving wireless signals 134 between device 102 and remote control 120 (functions 202 and 212, respectively), measuring the quality of signals received at the remote control 120 (function 214) and at the controlled device 102 (function 206), providing an indication of measured signal quality (functions 216 and 204), and providing feedback about the quality of signals received at the remote control 120 and/or the controlled device 102 (function 208). Various other functions and other features may also be provided, as described in increasing detail below.

Both device 102 and remote control 120 transmit and receive wireless signals 134 as appropriate (functions 202 and 212, respectively). As noted above, device 102 is able to transmit and receive wireless signals 134 using RF interface 112, which operates under the direction of controller 105. Remote control 120 similarly transmits and receives wireless signals using RF interface 130 under direction of processor 122. Signals 134 may be transmitted in accordance with IEEE 802.15.4, IEEE 802.15.1, IEEE 802.11 and/or any other wireless local area network (WLAN) or other short-range wireless signaling techniques, as noted above.

In various embodiments, wireless signals 134 support the transmission of user commands from remote control 120 to device 102 in accordance with any signaling scheme or protocol. In embodiments wherein device 102 is a set top box, for example, commands issued by remote control may correspond to volume adjustments, programming selections or other inputs provided by a television viewer. Such commands may be processed by controller 105 to adjust programming received and presented to the viewer, or for any other purpose. Other embodiments may similarly provide any sort of control commands using any number of single or multi-dimensional input features of remote control 120.

As noted above, remote control 120 measures the quality of received signals 134 as appropriate (function 214). Quality may be measured in any manner; in various embodiments, "quality" is determined as a function of both the strength of signals 134 and the amount of noise that is present. Both signal strength and noise may be measured by remote control 120, as appropriate. In some embodiments, some or all of the wireless signals 134 used to support command and control of device 102 are simply monitored by RSSI or other signal monitoring logic operating under the direction and control of processor 122 to measure the strengths of the received signals. RSSI or similar logic can similarly be used to measure the amount of noise present at remote control 120. Typically, RSSI circuitry simply provides an output that describes the magnitude of an RF signals received at a tuned frequency received by antenna 132. If this magnitude is measured while device 102 is transmitting signals 134, the resulting magnitude will represent the strength of the received signal. Conversely, the received signal strength corresponds to a noise measurement when device 102 is not transmitting signals 134. Measurements of signal strength and/or noise may be quantized and represented in any manner (e.g., using milliwatts (mW), dBm and/or any other standard or non-standard units) as desired.

In various embodiments, additional information may be gathered at remote control 120 (function 215). Such information may include, for example, an indication of absolute or relative position of the remote control 120 using position sensor 128. Signal quality measurements for particular positions may be tracked or gathered over time in various embodiments to allow for improved identification of locations that provide the best signal quality.

The quality metrics obtained by remote control 120 may be provided to controlled device 102 and/or otherwise processed as appropriate (function 216). In various embodiments, the metrics are provided as payload data in a message (e.g., message 135) that is formatted in accordance with the protocols used to transmit and receive wireless signals 134. In such embodiments, processor 122 suitably directs the operation of RF interface 130 to transmit message 135 with the appropriate payload data, including any signal quality metrics as well as any position indicia and/or other information that may be available. Other embodiments may simply provide feedback about the signal quality measured at remote 120 and/or at device 102 using any interface features of remote control 120. SNR values may be graphically or alphanumerically presented on a display associated with remote control 120, for example. Other embodiments may provide visual or audible feedback using any other available interface features.

In the embodiment shown in FIG. 2, message 135 is received with wireless signals 134 at RF interface 112 as appropriate (function 204). In various embodiments, controller 105 directs the operation of RF interface 112 to extract and receive payload data, including the signal quality metrics, from received messages. As noted above, other embodiments may additionally or alternately transmit measurement data in a message 135 that is sent from device 102 to remote control 120 as desired.

In addition to receiving measurement data from remote control 120, various embodiments of controlled device 102 also measure the quality of wireless signals 134 (function 206). As noted above, signal quality may be measured based upon the strength of received signals 134, as well as the intensity of any noise, and/or any other information. Signal strength and noise may be quantified using, for example, RSSI circuitry associated with RF interface 112 or other logic operating under the direction of controller 105.

Signal quality measurements obtained from the remote control 120 and from the controlled device 102 may be processed in any manner. Signal strength and noise measurements may be combined (e.g., to compute a signal-to-noise ratio) in any manner. In some embodiments, remote control 120 computes SNR values based upon measured data, and the SNR values are transmitted to device 102 as the quality metric. In other embodiments, remote control 120 transmits separate values for signal and noise measurements so that device 102 can separately process and/or display both signal and noise measurements.

In various embodiments, signal quality data is provided as feedback to a viewer, installer, CSR or other user (function 208) as desired. Feedback may be provided by, for example, directing the presentation of the signal strength measurements on display 104 or the like. In various embodiments, controller 105 directs the presentation of signal quality data on display 104 by controlling the output signals generated by display interface 111 as appropriate. Measurement information may be presented graphically, numerically, alphanumerically or in any other format, and in some embodiments multiple measurements (e.g., measurements gathered over a period of time) may be averaged or otherwise mathematically combined with each other as desired. Function 208 may alternately or additionally involve storing measurement information in a log file or database, and/or transmitting measurement information over network 110 to a remotely-located computing system 142, such as a computer terminal associated with a CSR.

As noted above, the processing of transmitting and receiving wireless signals, measuring the quality of received signals, and providing the signal quality metrics may be repeated on any temporal basis to provide real time (or near real time) feedback. This information may be useful, for example, in determining appropriate locations for device 102 and/or remote control 120 since changes in signal strength can be readily observed as the device 102 and/or remote control 120 are moved relative to each other. This feature may be useful during installation, troubleshooting, maintenance and/or operation of device 102.

Generally speaking, the various functions and features of method 200 may be carried out with any sort of hardware, software and/or firmware logic that is stored and/or executed on any platform. Some or all of method 200 may be carried out, for example, by logic executing within device 102 and/or remote control 120 in FIG. 1. In one embodiment, controller 105 executes software or firmware logic stored in memory 107 or elsewhere that performs each of the various functions 202-208 associated with device 102. Functions 212-216 that are performed by remote control 120 may be similarly performed by software or firmware stored in memory 124 and executed in processor 122. The particular logic and hardware that implements any of the various functions shown in FIG. 2, however, may vary from context to context, implementation to implementation, and embodiment to embodiment in accordance with the various features, scenarios and structures set forth herein. The particular means used to implement each of the various functions shown in FIG. 2, then, could be any sort of processing structures that are capable of executing conventional software logic in any format. Such processing hardware may include controller 105 or other components of device 102 in FIG. 1, as well as any processors 122 and/or other components associated with remote control 120 as appropriate.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method to provide feedback about communications between a device and a remote control, the method comprising:

transmitting a wireless signal from the device to the remote control;

receiving, at the device, a wireless message from the remote control, wherein the wireless message comprises a description of the quality of the wireless signal received by the remote control, wherein the quality of the wireless signal is determined as a function of an amount of noise measured by the remote control so that wireless message describes the quality of the wireless signal transmitted from the device to the remote control as it is received by the device; and providing feedback based upon the quality of the wireless signal that is received at the remote control.

2. The method of claim 1 further comprising repeating the transmitting, receiving and providing as the device and the remote control are moved relative to each other, and updating the feedback from the device as the quality of the wireless signal received at the remote control changes.

3. The method of claim 1 wherein the quality is determined as a function of the strength of the wireless signal as measured by the remote control.

4. The method of claim 1 further comprising receiving a second wireless signal at the device from the remote control and measuring the quality of the second wireless signal at the device.

5. The method of claim 4 wherein the quality of the second wireless signal is determined as a function of the strength of the second wireless signal as measured by the device and of and the amount of noise measured by the device.

6. The method of claim 4 further comprising repeating the transmitting, receiving and providing, and wherein the providing comprises updating a presentation on a display as the quality of the wireless signal and the quality of the second wireless signal change.

7. The method of claim 6 wherein the updating comprises updating the presentation on the display as the device and the remote control are moved relative to each other.

8. The method of claim 7 wherein the updating the presentation on the display comprises providing an indication of an acceptable signal quality on the display.

9. A device configured to communicate with a remote control, the device comprising:

a radio frequency interface configured to wirelessly communicate with the remote control; and a controller configured to direct the radio frequency interface to transmit a wireless signal to the remote control, to receive a wireless message from the remote control via the radio frequency interface that comprises a description of the quality of the wireless signal as received by the remote control, and to initiate feedback from the device based upon the quality of the wireless signal, wherein the quality of the wireless signal transmitted by the radio frequency interface is determined as a function of an amount of noise measured by the remote control and is provided to the device via the wireless message.

10. The device of claim 9 further comprising a programming interface configured to receive television programming and a display interface configured to provide output signals to a display, wherein the controller is further configured to direct presentation of the television programming received via the programming interface on the display.

11. The device of claim 9 wherein the quality of the wireless signal is determined as a function of the strength of the wireless signal as measured by the remote control.

12. The device of claim 10 wherein the controller is configured to receive a second wireless signal from the remote control via the radio frequency interface and to process an instruction contained within the second wireless signal to change the presentation of television programming on the display.

13. The device of claim 9 further comprising a network interface configured to transmit and receive data on a digital network, and wherein the controller is configured to provide the feedback at least in part by transmitting the quality of the wireless signal to a remote computing system via the network interface.

14. A remote control configured to provide wireless commands to a controlled device, the remote control comprising:

a radio frequency interface configured to receive a wireless signal from the controlled device; and a processor coupled to the radio frequency interface, wherein the processor is configured to measure determine a quality metric of the wireless signal received from the controlled device at the remote control, and to provide data indicative of the quality metric from the remote control to the controlled device via the radio frequency interface to thereby allow the controlled device to provide feedback about the wireless signals that are received by the remote control, wherein the quality metric is determined as a function of an amount of noise measured at the remote control.

15. The remote control of claim 14 further comprising a position sensor configured to detect the position of the remote control, and wherein the processor is further configured to provide an indication of the position to the controlled device via the radio frequency interface.

16. The remote control of claim 14 wherein the radio frequency interface comprises a received signal strength indicator configured to measure the strength of the wireless signal, and wherein the quality metric is determined as a function of the strength of the wireless signal.

17. The remote control of claim 16 wherein the received signal strength indicator is further configured to measure the amount of noise, and wherein the quality metric is further determined as a function of the amount of noise.

18. The remote control of claim 15 further comprising a user interface coupled to the processor, wherein the processor is further configured to provide feedback about the quality metric to a user via the user interface.

* * * * *